(12) United States Patent
Hackler

(10) Patent No.: US 11,772,421 B2
(45) Date of Patent: Oct. 3, 2023

(54) VEHICLE WHEEL TRACTION ASSEMBLY

(71) Applicant: James Hackler, Turlock, CA (US)

(72) Inventor: James Hackler, Turlock, CA (US)

( * ) Notice: Subject to any disclaimer, the term of this patent is extended or adjusted under 35 U.S.C. 154(b) by 238 days.

(21) Appl. No.: 17/072,123

(22) Filed: Oct. 16, 2020

(65) Prior Publication Data

US 2022/0118794 A1 Apr. 21, 2022

(51) Int. Cl.
*B60B 39/12* (2006.01)

(52) U.S. Cl.
CPC ........ *B60B 39/12* (2013.01); *B60B 2900/721* (2013.01)

(58) Field of Classification Search
CPC ....... B60B 15/00; B60B 15/263; B60B 39/00; B60B 39/02; B60B 39/12; B60B 2900/551; B60B 2900/721; B60C 27/00; E01C 9/08; E01C 9/086; E01C 9/083
USPC .......................................................... 238/14
See application file for complete search history.

(56) References Cited

U.S. PATENT DOCUMENTS

| | | | |
|---|---|---|---|
| 2,975,977 A * | 3/1961 | Chodacki | B60S 9/04 238/14 |
| 3,008,643 A | 11/1961 | Tanner | |
| 3,701,474 A | 10/1972 | Welz | |
| 3,910,491 A | 10/1975 | Ducharme | |
| 4,261,510 A | 4/1981 | Andrus | |
| 4,697,628 A * | 10/1987 | Brown | B60C 27/04 152/218 |
| 5,100,054 A * | 3/1992 | Fickett | B60B 39/12 238/14 |
| 5,383,742 A * | 1/1995 | Grace | E01C 9/083 238/14 |
| 6,520,420 B1 * | 2/2003 | Singh | B60B 39/12 238/14 |
| 6,779,738 B1 | 8/2004 | Stannard | |
| 8,210,443 B2 * | 7/2012 | Studstill | B60B 39/00 238/14 |
| D669,025 S | 10/2012 | Spektor | |
| 9,878,579 B2 | 1/2018 | Rosier | |
| 10,538,127 B2 * | 1/2020 | Brown, Jr. | B66F 5/025 |
| 2016/0121653 A1 | 5/2016 | Letarte | |

FOREIGN PATENT DOCUMENTS

| | | |
|---|---|---|
| JP | S543752 | 1/1979 |
| WO | WO2015150650 | 10/2015 |

\* cited by examiner

*Primary Examiner* — S. Joseph Morano
*Assistant Examiner* — Cheng Lin
(74) *Attorney, Agent, or Firm* — Sheppard, Mullin, Richter & Hampton LLP

(57) ABSTRACT

A vehicle wheel traction assembly for use in freeing a stuck vehicle includes a plate having a plurality of ridges engaged thereto and extending from a first face thereof. A second face of the plate can be positioned upon a surface proximate to a drive wheel of a vehicle to increase traction of the drive wheel relative to that of the drive wheel directly upon the surface. A handle is engaged by a pivot pin to the second face of the plate proximate to a first end thereof. The pivot pin is biased toward a first terminus of the handle. The handle is rotatable between a deployed configuration, wherein a second terminus of the handle is positioned distal from the plate, and a stowed configuration, wherein the handle extends between the first end and a second end of the plate.

23 Claims, 7 Drawing Sheets

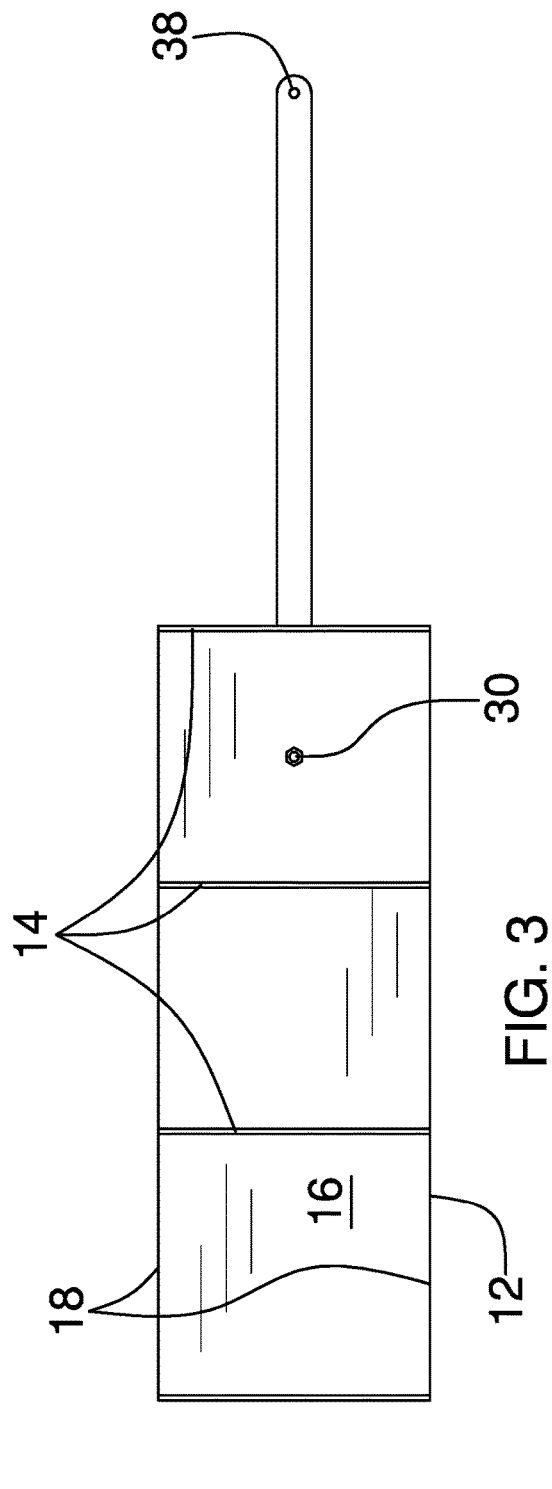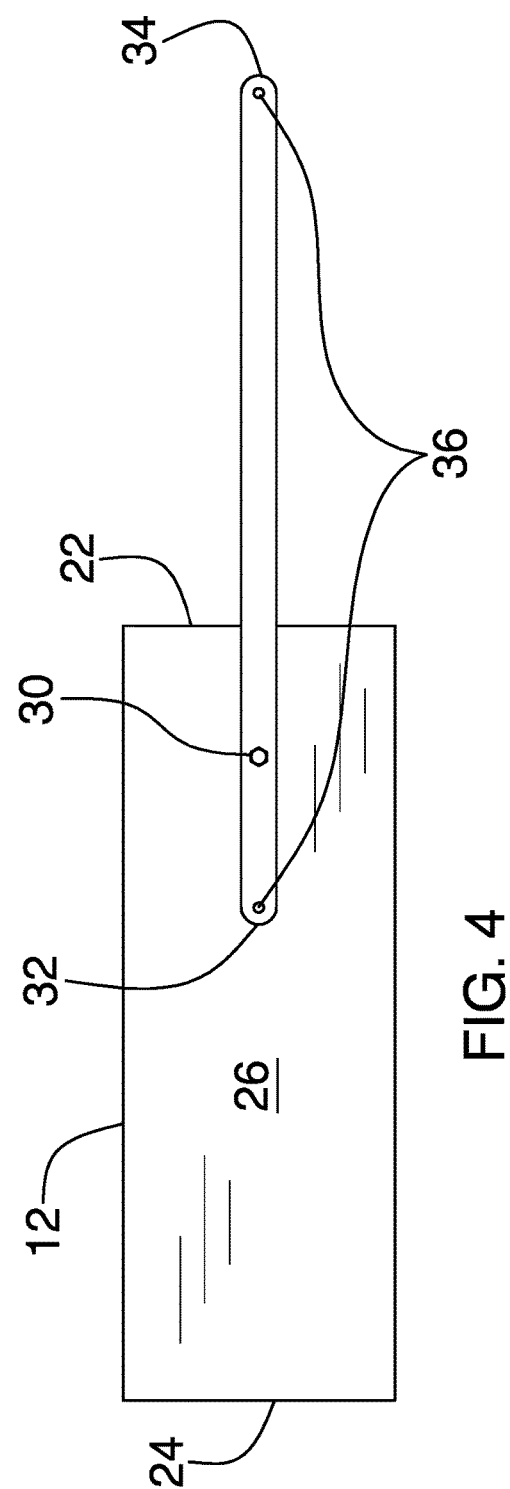

VEHICLE WHEEL TRACTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to traction assemblies and more particularly pertains to a new traction assembly for use in freeing a stuck vehicle.

(2) Description of Related Art Including Information Disclosed Under 37 CFR 1.97 and 1.98

The prior art relates to traction assemblies, which may comprise hingedly interconnected treaded plates, plates with treads on opposing faces, and mats having spikes extending therefrom. What is lacking in the prior art is a pair of traction plates having elongated handles, which can be used to position the plates and also to engage the plates together for stowage when not in use.

BRIEF SUMMARY OF THE INVENTION

An embodiment of the disclosure meets the needs presented above by generally comprising a plate having a plurality of ridges engaged thereto and extending from a first face thereof. The plate is configured for a second face thereof to be positioned upon a surface proximate to a drive wheel of a vehicle to increase traction of the drive wheel relative to that of the drive wheel directly upon the surface. A handle is engaged by a pivot pin to the second face of the plate proximate to a first end thereof. The pivot pin is biased toward a first terminus of the handle. The handle is rotatable between a deployed configuration, wherein a second terminus of the handle is positioned distal from the plate, and a stowed configuration, wherein the handle extends between the first end and a second end of the plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a top view of an embodiment of the disclosure.

FIG. 4 is a bottom view of an embodiment of the disclosure.

DETAILED DESCRIPTION OF THE INVENTION

Figure 1:
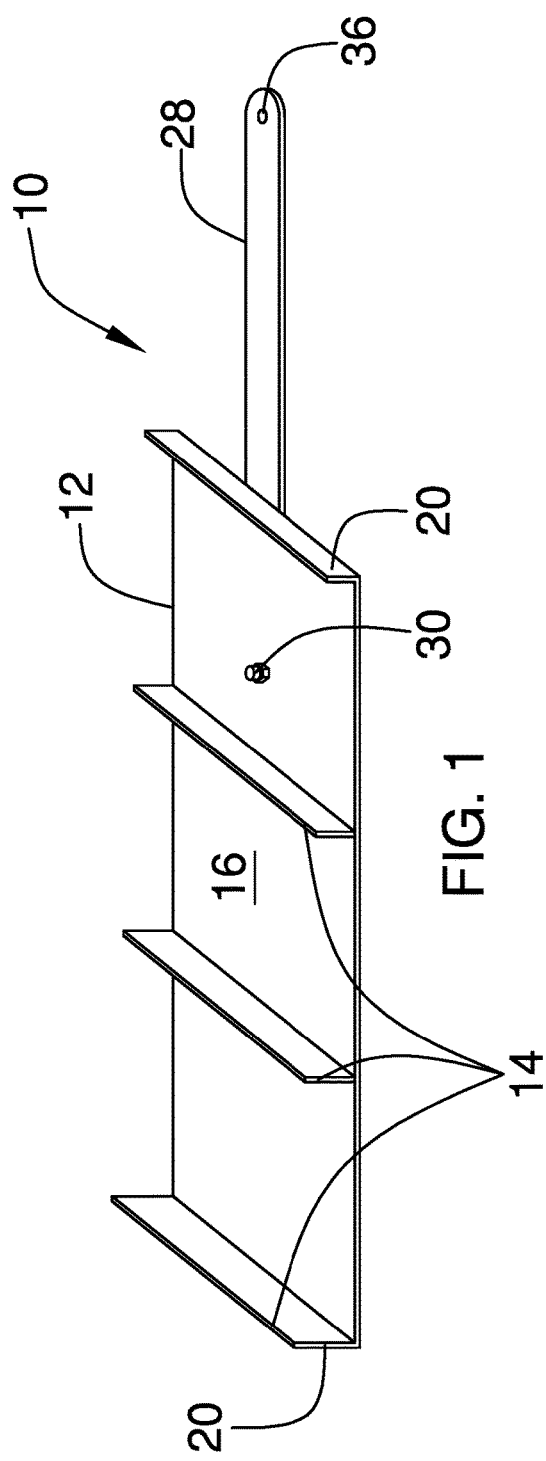
FIG. 1 is a top isometric perspective view of a vehicle wheel traction assembly according to an embodiment of the disclosure.

With reference now to the drawings, and in particular to FIGS. 1 through 10 thereof, a new traction assembly embodying the principles and concepts of an embodiment of the disclosure and generally designated by the reference numeral 10 will be described.

As best illustrated in FIGS. 1 through 10, the vehicle wheel traction assembly 10 generally comprises a plate 12 having a plurality of ridges 14 engaged thereto and extending from a first face 16 thereof. The plate 12 is elongated rectangularly shaped. Each ridge 14 extends linearly between opposed sides 18 of the plate 12. Each ridge 14 has a respective height 20 so that the plurality of ridges 14 comprises ridges 14 that have a variety of heights 20. The heights 20 increase from a respective ridge 14 positioned adjacent to a first end 22 of the plate 12 to a respective ridge 14 positioned adjacent to a second end 24 of the plate 12 so that the plurality of ridges 14 tapers upwardly from the first end 22 to the second end 24 when viewed from a respective opposed side 18 of the plate 12.

The plurality of ridges 14 comprises from three to twelve ridges 14. The plurality of ridges 14 may comprise four ridges 14, as shown in FIG. 1. Each ridge 14 has a height 20 of from 1.5 to 4.5 centimeters. The ridges 14 are spaced at from 10.0 to 25.0 centimeters. The ridges 14 may be spaced at 14.8 centimeters.

The plate 12 is configured for a second face 26 thereof to be positioned upon a surface, proximate to a drive wheel of a vehicle, to increase traction of the drive wheel relative to that of the drive wheel directly upon the surface.

A handle 28 is engaged by a pivot pin 30 to the second face 26 of the plate 12 proximate to the first end 22. The pivot pin 30 is biased toward a first terminus 32 of the handle 28. The handle 28 is rotatable between a deployed configuration, wherein a second terminus 34 of the handle 28 is positioned distal from the plate 12, and a stowed configuration, wherein the handle 28 extends between the first end 22 and a second end 24 of the plate 12. The handle 28 in the deployed configuration can aid in positioning of the plate 12 proximate to the wheel.

The handle 28 is dimensionally longer than the plate 12 so that, in the stowed configuration, the first terminus 32 and the second terminus 34 of the handle 28 protrude from the first end 22 and the second end 24 of the plate 12, respectively. A pair of connectors 36 is engaged to the handle 28 and is positioned singly proximate to the first terminus 32 and the second terminus 34. The connectors 36 are selectively mutually couplable.

Figure 6:
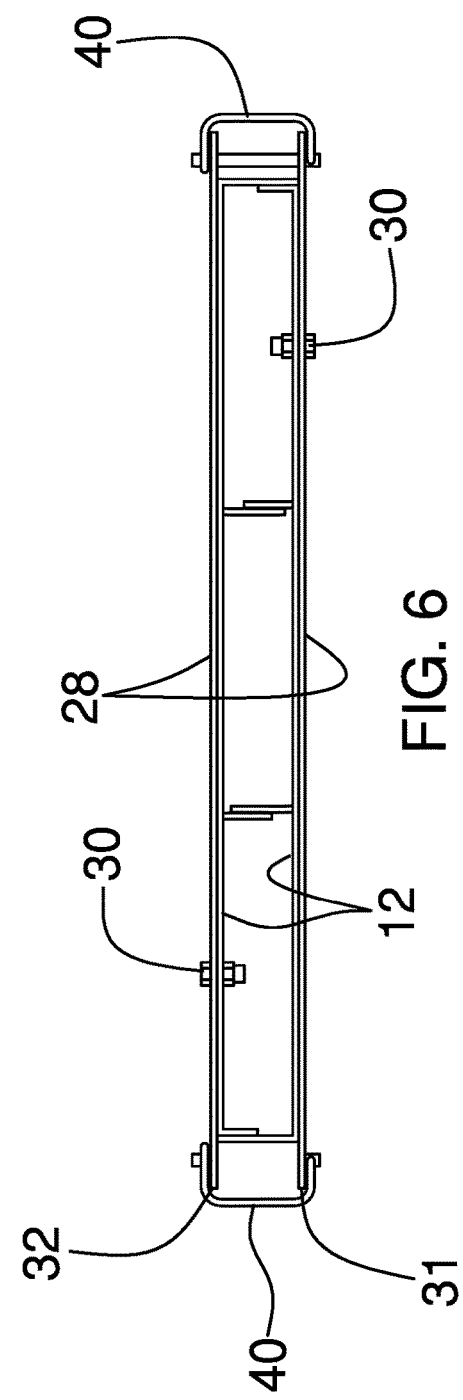
FIG. 6 is a side view of an embodiment of the disclosure configured for stowage.
Figure 7:
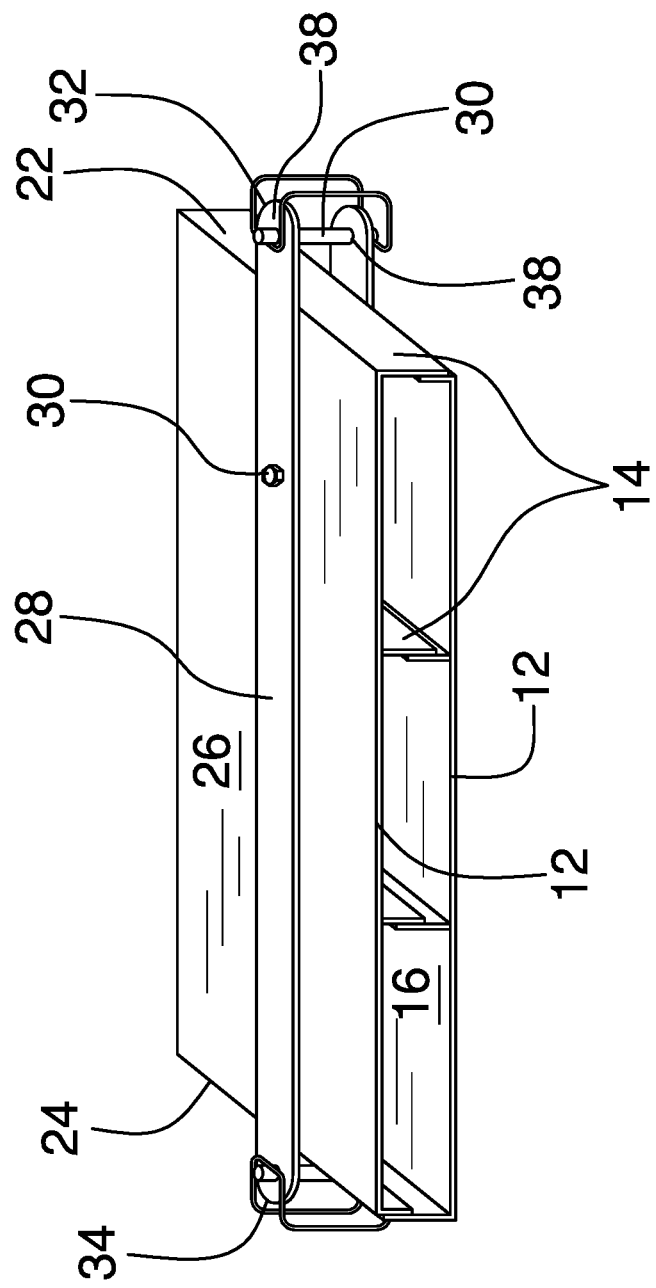
FIG. 7 is an isometric perspective view of an embodiment of the disclosure configured for stowage.
Figure 8:
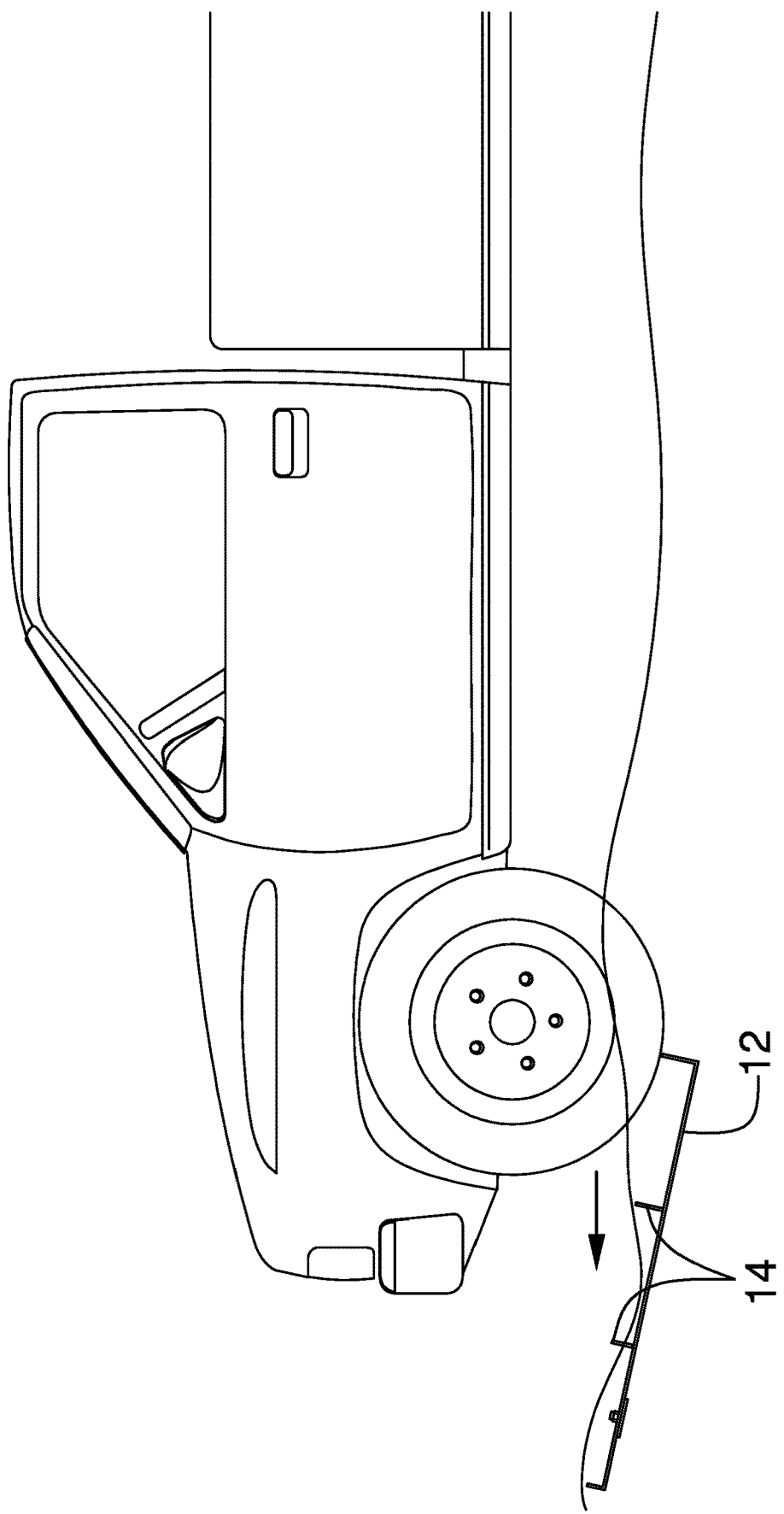
FIG. 8 is an in-use view of an embodiment of the disclosure.
Figure 9:
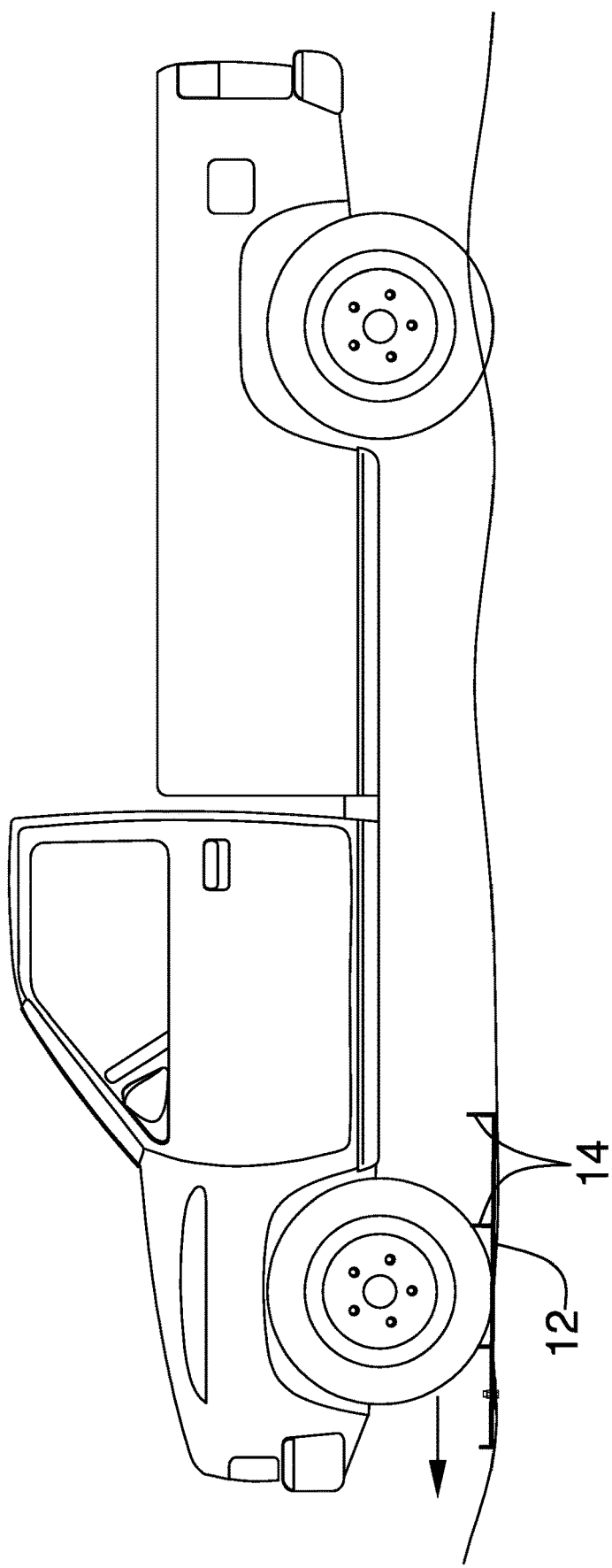
FIG. 9 is an in-use view of an embodiment of the disclosure.
Figure 10:
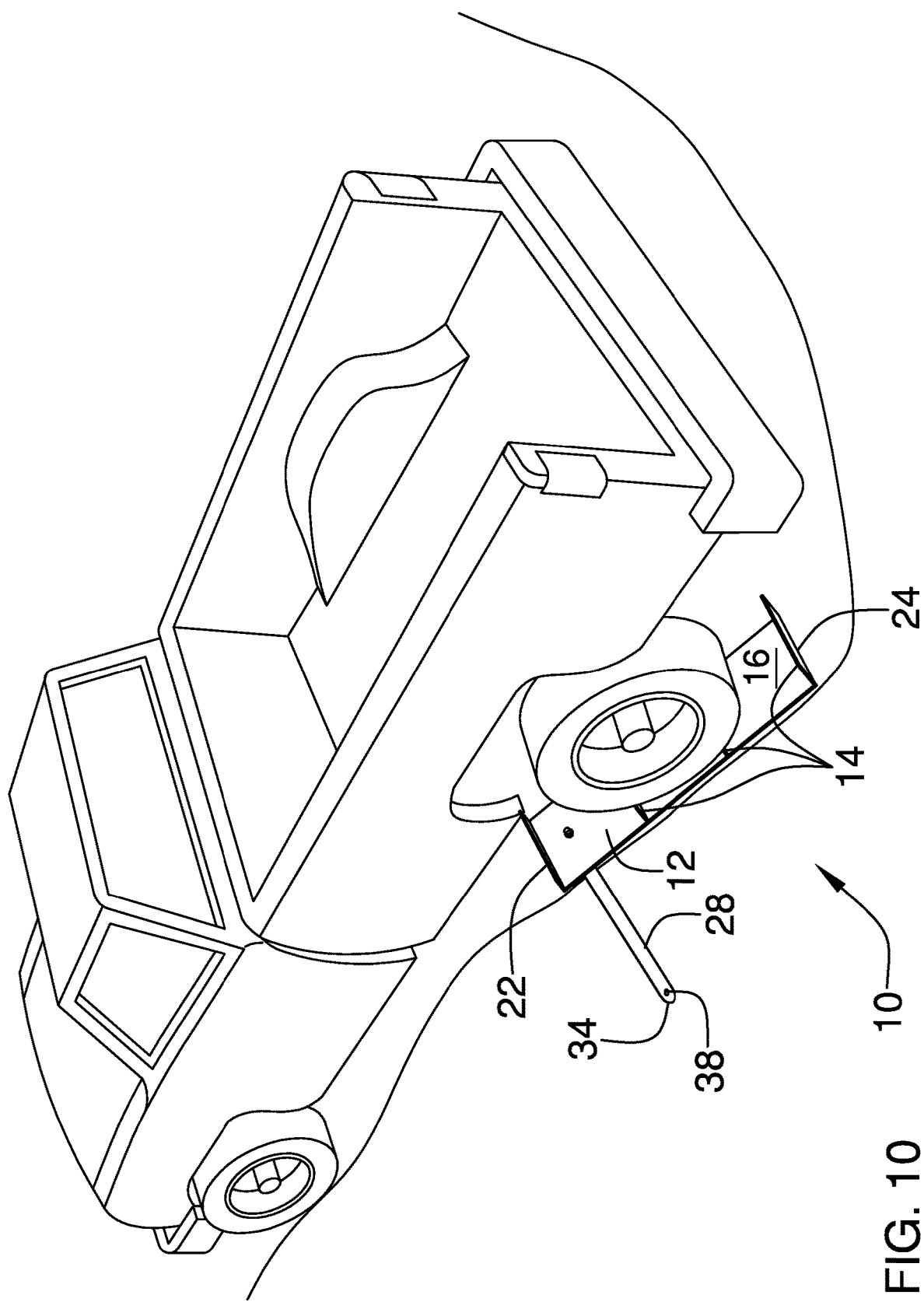
FIG. 10 is an in-use view of an embodiment of the disclosure.

The plate 12 is one of a pair of plates 12. Each plate 12 is configured to be positioned on the surface proximate to a respective drive wheel of the vehicle to increase traction of the respective drive wheel relative to that of the respective drive wheel directly upon the surface. The plates 12 are nestable with the first faces 16 are facing and the first ends 22 are opposingly positioned. With each handle 28 in the stowed configuration, the connectors 36 of one of the handles 28 are positioned to selectively engage the connectors 36 of the other of the handles 28 to mutually engage the plates 12 for stowage thereof, as shown in FIGS. 6 and 7.

Figure 2:
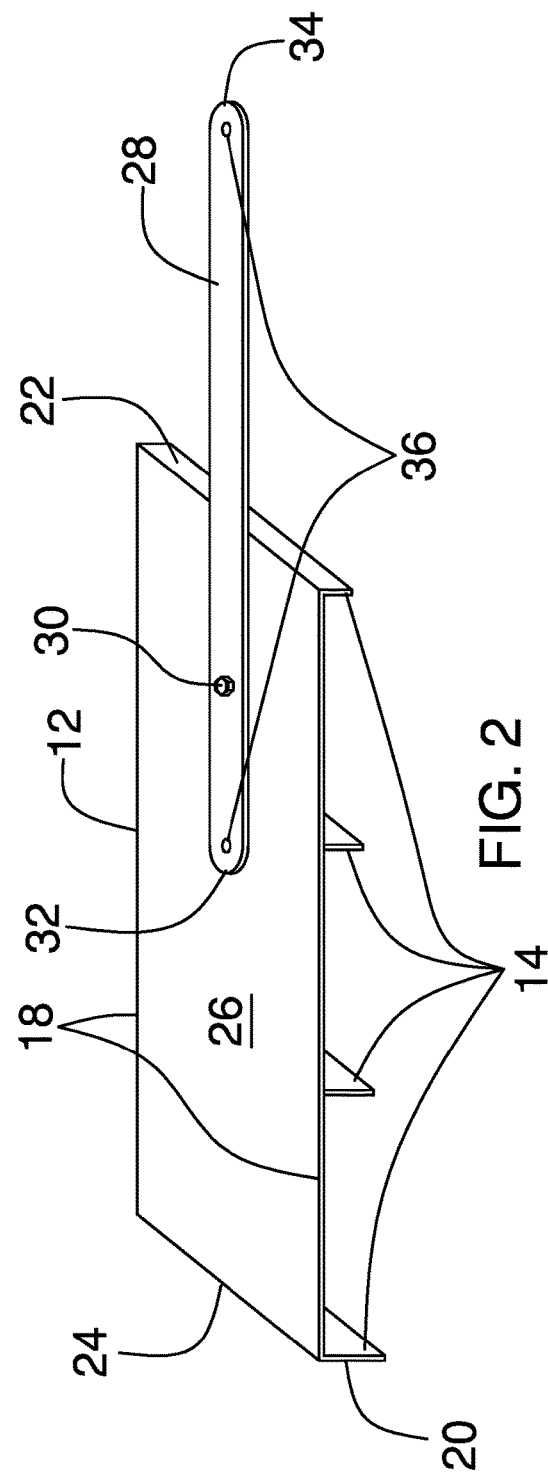
FIG. 2 is a bottom isometric perspective view of an embodiment of the disclosure.
Figure 5:
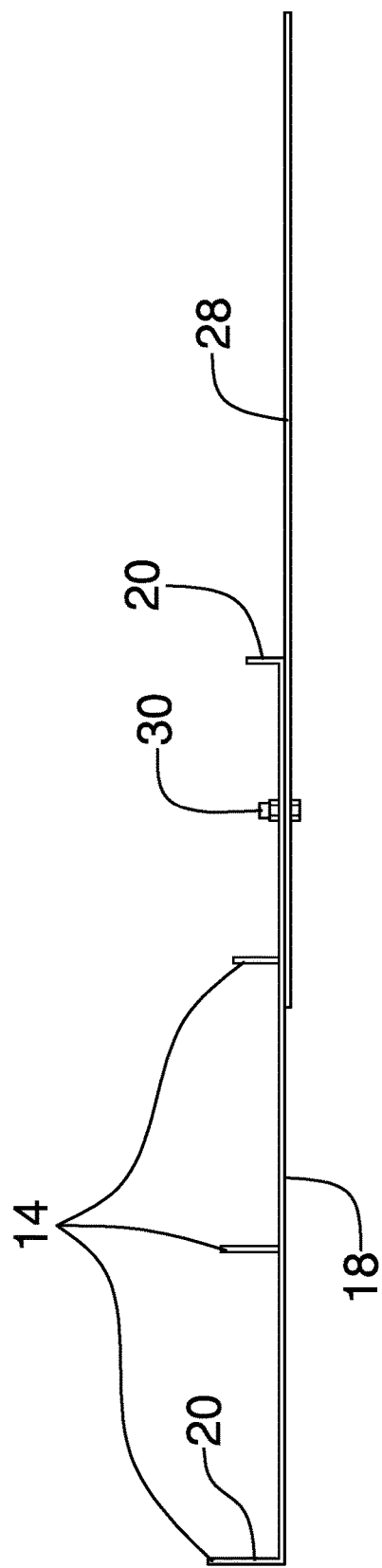
FIG. 5 is a side view of an embodiment of the disclosure.

Each connector 36 comprises a hole 38, as shown in FIG. 2. The hole 38 positioned proximate to the first terminus 32 of one of the handles 28 is selectively alignable with the hole 38 positioned proximate to the second terminus 34 of the other of the handles 28. Thus aligned, the holes 38 are positioned or insertion of a respective fastener 40 to mutually engage the plates 12 for stowage thereof.

In use, the pair of plates 12 is removed from storage when required to increase traction of the drive wheels of a stuck vehicle. The plates 12 are separated by removing the fasteners 40 from the holes 38. The handles 28 are used to position the plates 12 on the surface proximate to each of the drive wheels of the vehicle. The vehicle then can be driven over the pair of plates 12 to solid ground.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A vehicle wheel traction assembly comprising:
   a plate having a first face and an opposite second face;
   a plurality of ridges extending across the first face of the plate, wherein heights of the ridges of the plurality of ridges increase from a first end of the plate to an opposite second end of the plate; and
   a handle pivotably engaged to the plate proximate to the first end of the plate, such that the handle is pivotable between a deployed configuration, wherein the handle extends away from the first end of the plate, and a stowed configuration, wherein the handle is positioned adjacent to the second face of the plate;
   wherein the second face of the plate is configured for positioning upon a surface proximate to a drive wheel of a vehicle for increasing traction of the drive wheel relative to that of the drive wheel directly upon the surface.

2. The vehicle wheel traction assembly of claim 1, wherein:
   the plate is an elongated rectangular shape having a first elongated edge and a second elongated edge; and
   each ridge of the plurality of ridges extends linearly from the first elongated edge across to the second elongated edge.

3. The vehicle wheel traction assembly of claim 1, wherein the plurality of ridges comprises from three to twelve ridges.

4. The vehicle wheel traction assembly of claim 3, wherein the plurality of ridges comprises four ridges.

5. The vehicle wheel traction assembly of claim 1, wherein each ridge has a height of from 1.5 to 4.5 centimeters.

6. The vehicle wheel traction assembly of claim 1, wherein each ridge of the plurality of ridges is equally spaced from an adjacent ridge of the plurality of ridges at a distance of from 10.0 to 25.0 centimeters center to center.

7. The vehicle wheel traction assembly of claim 6, wherein the distance is 14.8 centimeters center to center.

8. The vehicle wheel traction assembly of claim 1, wherein:
   the handle has a first terminus and a second terminus;
   the handle is dimensionally longer than the plate, such that the first terminus and the second terminus of the handle protrude from the first end and a second end of the plate, respectively;
   a pair of connectors is engaged to the handle and positioned singly proximate to the first terminus and the second terminus, the connectors being selectively mutually couplable; and
   the plate is one of a pair of plates, wherein each plate is configured for positioning on the surface proximate to a respective drive wheel of the vehicle for increasing traction of the respective drive wheel relative to that of the respective drive wheel directly upon the surface, such that the plates are nestable with the first faces oppositely facing and the first ends being opposingly positioned, and such that, with each handle in the stowed configuration, the connectors of one of the handles are positioned for selectively engaging the connectors of the other of the handles for mutually engaging the plates for stowage thereof.

9. The vehicle wheel traction assembly of claim 8, wherein each connector comprises a hole, such that the hole positioned proximate to the first terminus of one of the handles is selectively alignable with the hole positioned proximate to the second terminus of the other of the handles, positioning the holes for insertion of a respective fastener for mutually engaging the plates for stowage thereof.

10. The vehicle wheel traction assembly of claim 1, wherein:
the handle has a first end and an opposite second end; and
the handle is longer than the plate, such that the first end of the handle protrudes from the first end of the plate and the second end of the handle protrudes from the second end of the plate.

11. The vehicle wheel traction assembly of claim 10, wherein the handle comprises:
a first connector proximate the first end of the handle; and
a second connector proximate the second end of the handle.

12. The vehicle wheel traction assembly of claim 11, wherein the plate is one of a pair of plates, the pair of plates being nestable with the second face of a first one of the pair of plates facing toward the second face of the other one of the pair of plates.

13. The vehicle wheel traction assembly of claim 12, wherein, when the handle of each of the pair of plates is in the stowed configuration and the pair of plates is nested, the first and second connectors of the handle of one of the pair of plates are positioned adjacent to the second and first connectors, respectively, of the handle of the other of the pair of plates.

14. A vehicle wheel traction assembly comprising:
a plate, the plate being elongated rectangularly shaped;
a plurality of ridges engaged to and extending from a first face of the plate, wherein the plate is configured for positioning of a second face thereof upon a surface proximate to a drive wheel of a vehicle for increasing traction of the drive wheel relative to that of the drive wheel directly upon the surface, each ridge extending linearly between opposed sides of the plate, each ridge having a respective height such that the plurality of ridges comprises ridges having a variety of heights, the heights increasing from a respective ridge positioned adjacent to a first end of the plate to a respective ridge positioned adjacent to a second end of the plate, such that the plurality of ridges tapers upwardly from the first end to the second end when viewed from a respective opposed side of the plate, the plurality of ridges comprising four ridges, each ridge having a height of from 1.5 to 4.5 centimeters, the ridges being spaced at from 10.0 to 25.0 centimeters;
a handle engaged by a pivot pin to the second face of the plate proximate to the first end thereof, the pivot pin being biased toward a first terminus of the handle, such that the handle is rotatable between a deployed configuration, wherein a second terminus of the handle is positioned distal from the plate, and a stowed configuration, wherein the handle extends between the first end and the second end of the plate, the handle being dimensionally longer than the plate, such that the first terminus and the second terminus of the handle protrude from the first end and the second end of the plate, respectively; and a pair of connectors engaged to the handle and positioned singly proximate to the first terminus and the second terminus, the connectors being selectively mutually couplable;
wherein the plate is one of a pair of plates, wherein each plate is configured for positioning on the surface proximate to a respective drive wheel of the vehicle for increasing traction of the respective drive wheel relative to that of the respective drive wheel directly upon the surface, such that the plates are nestable with the first faces oppositely facing and the first ends being opposingly positioned, and such that, with each handle in the stowed configuration, the connectors of one of the handles are positioned for selectively engaging the connectors of the other of the handles for mutually engaging the plates for stowage thereof; and
wherein each connector comprises a hole, such that the hole positioned proximate to the first terminus of one of the handles is selectively alignable with the hole positioned proximate to the second terminus of the other of the handles, positioning the holes for insertion of a respective fastener for mutually engaging the plates for stowage thereof.

15. A vehicle wheel traction assembly comprising:
a pair of plates, each of the pair of plates having a first face, an opposite second face, and a plurality of ridges extending across the first face; and
a pair of handles, each of the pair of handles pivotably engaged to one of the pair of plates proximate to a first end thereof;
wherein each handle of the pair of handles is pivotable between a deployed configuration, wherein the handle extends away from the first end of the plate to which the handle is pivotably engaged, and a stowed configuration, wherein the handle is positioned adjacent to the second face of the plate to which the handle is pivotably engaged;
wherein the second face of each of the pair of plates is configured for positioning upon a surface proximate to a drive wheel of a vehicle for increasing traction of the drive wheel relative to that of the drive wheel directly upon the surface;
wherein the pair of plates are nestable with the second face of a first one of the pair of plates facing toward the second face of the other one of the pair of plates;
wherein each of the pair of handles has a first end and an opposite second end; and
wherein each of the pair of handles is longer than the plate to which the handle is pivotably engaged, such that the first end of the handle protrudes from the first end of the plate to which the handle is pivotably engaged and the second end of the handle protrudes from the second end of the plate to which the handle is pivotably engaged.

16. The vehicle wheel traction assembly of claim 15, wherein each of the pair of handles comprises:
a first connector proximate the first end of the handle; and
a second connector proximate the second end of the handle.

17. The vehicle wheel traction assembly of claim 16, wherein, when the handle of each of the pair of plates is in the stowed configuration and the pair of plates is nested, the first and second connectors of the handle of one of the pair of plates are positioned adjacent to the second and first connectors, respectively, of the handle of the other of the pair of plates.

18. A vehicle wheel traction assembly comprising:
a plate;

a plurality of ridges extending across a first face of the plate, wherein the plate is configured for positioning of a second face thereof upon a surface proximate to a drive wheel of a vehicle for increasing traction of the drive wheel relative to that of the drive wheel directly upon the surface; and a handle engaged by a pivot pin to the second face of the plate proximate to a first end thereof, the pivot pin being biased toward a first terminus of the handle, such that the handle is rotatable between a deployed configuration, wherein a second terminus of the handle is positioned distal from the plate, and a stowed configuration, wherein the handle extends between the first end and a second end of the plate;

wherein each ridge has a respective height such that the plurality of ridges comprises ridges having a variety of heights, the heights increasing from a respective ridge positioned adjacent to the first end of the plate to a respective ridge positioned adjacent to the second end of the plate, such that the plurality of ridges tapers upwardly from the first end to the second end when viewed from a side of the plate.

19. A vehicle wheel traction assembly comprising:

a plate;

a plurality of ridges extending across a first face of the plate, wherein the plate is configured for positioning of a second face thereof upon a surface proximate to a drive wheel of a vehicle for increasing traction of the drive wheel relative to that of the drive wheel directly upon the surface;

a handle engaged by a pivot pin to the second face of the plate proximate to a first end thereof, the pivot pin being biased toward a first terminus of the handle, such that the handle is rotatable between a deployed configuration, wherein a second terminus of the handle is positioned distal from the plate, and a stowed configuration, wherein the handle extends between the first end and a second end of the plate, wherein the handle is dimensionally longer than the plate, such that the first terminus and the second terminus of the handle protrude from the first end and the second end of the plate, respectively; and a pair of connectors engaged to the handle and positioned singly proximate to the first terminus and a second terminus, the connectors being selectively mutually couplable;

wherein the plate is one of a pair of plates, wherein each plate is configured for positioning on the surface proximate to a respective drive wheel of the vehicle for increasing traction of the respective drive wheel relative to that of the respective drive wheel directly upon the surface, such that the plates are nestable with the first faces oppositely facing and the first ends being opposingly positioned, and such that, with each handle in the stowed configuration, the connectors of one of the handles are positioned for selectively engaging the connectors of the other of the handles for mutually engaging the plates for stowage thereof.

20. A vehicle wheel traction assembly comprising:

a plate having a first face and an opposite second face;

a plurality of ridges extending across the first face of the plate; and a handle pivotably engaged to the plate proximate to a first end of the plate, such that the handle is pivotable between a deployed configuration, wherein the handle extends away from the first end of the plate, and a stowed configuration, wherein the handle is positioned adjacent to the second face of the plate;

wherein the second face of the plate is configured for positioning upon a surface proximate to a drive wheel of a vehicle for increasing traction of the drive wheel relative to that of the drive wheel directly upon the surface;

wherein the handle has a first end and an opposite second end; and wherein the handle is longer than the plate, such that the first end of the handle protrudes from the first end of the plate and the second end of the handle protrudes from the second end of the plate.

21. The vehicle wheel traction assembly of claim 20, wherein the handle comprises:

a first connector proximate the first end of the handle; and a second connector proximate the second end of the handle.

22. The vehicle wheel traction assembly of claim 21, wherein the plate is one of a pair of plates, the pair of plates being nestable with the second face of a first one of the pair of plates facing toward the second face of the other one of the pair of plates.

23. The vehicle wheel traction assembly of claim 22, wherein, when the handle of each of the pair of plates is in the stowed configuration and the pair of plates is nested, the first and second connectors of the handle of one of the pair of plates are positioned adjacent to the second and first connectors, respectively, of the handle of the other of the pair of plates.

* * * * *